(12) United States Patent
Wachsmann et al.

(10) Patent No.: US 6,203,745 B1
(45) Date of Patent: Mar. 20, 2001

(54) INJECTION MOLDING FORM AND PROCESS FOR PRODUCING HOLLOW PARTS

(75) Inventors: Klaus Wachsmann, Erligheim; Guenther Steiner, Auenwald; Wolfgang Cedzich, Remseck, all of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/242,066

(22) PCT Filed: Jul. 12, 1997

(86) PCT No.: PCT/EP97/03734
§ 371 Date: May 11, 1999
§ 102(e) Date: May 11, 1999

(87) PCT Pub. No.: WO98/06556
PCT Pub. Date: Feb. 19, 1998

(30) Foreign Application Priority Data

Aug. 8, 1996 (DE) ............................................. 196 31 963

(51) Int. Cl.$^7$ .................................................. B29C 45/36
(52) U.S. Cl. .................................. 264/328.7; 264/328.8; 264/328.12; 425/577
(58) Field of Search ............................ 425/577, 570, 425/575; 264/328.8, 328.7, 328.12, 317, 328.11

(56) References Cited

U.S. PATENT DOCUMENTS

| | | | |
|---|---|---|---|
| 4,149,695 | * | 4/1979 | Quick et al. ...................... 264/328.7 |
| 4,874,570 | | 10/1989 | Haines .................................. 264/154 |
| 5,125,816 | * | 6/1992 | Morita ............................... 264/328.7 |
| 5,240,397 | * | 8/1993 | Fay et al. ............................... 425/577 |
| 5,670,184 | * | 9/1997 | Nakamichi et al. .................. 425/577 |

FOREIGN PATENT DOCUMENTS

| | | |
|---|---|---|
| 2 113 628 | 9/1972 | (DE) . |
| 0 381 223 | 8/1990 | (EP) . |
| 39 20 100 | 8/1990 | (DE) . |
| 1 193 442 | 6/1970 | (GB) . |

* cited by examiner

*Primary Examiner*—Jill L. Heitbrink
(74) *Attorney, Agent, or Firm*—Evenson, McKeown, Edwards & Lenahan, P.L.L.C.

(57) ABSTRACT

A process for producing closed or open hollow parts of molded synthetic resin material in which a core (12) or mold body which extends into the mold cavity and is attached to a form element and supported on other form elements is situated between two mold half-shells. The core is supported by one or more movable stops (13–18) which can be retracted from the mold cavity. Plastic is injected into the mold via a first injection channel (22) with the core retained in position by the stops (13–18). Subsequently the retaining stops (13–18) are retracted and the mold cavity is completely filled via a second injection channel (23, 24, 25).

7 Claims, 1 Drawing Sheet

INJECTION MOLDING FORM AND PROCESS FOR PRODUCING HOLLOW PARTS

BACKGROUND OF THE INVENTION

The invention relates to an injection molding form and to a process for producing closed or open hollow bodies of plastic according to the preamble of the main claim as well as the preamble of the accompanying process claim.

An injection molding form for producing closed or open hollow bodies of rubber or rubber-like synthetic resin is disclosed in DE-OS 21 13 628. In this form the core is supported by a retractable movable stop. The injection of the rubber or rubber-like material takes place at the support point. The mouth of the injection passage into the mold cavity is disposed in the area of the movable stop, for example in the form of an annular groove encompassing the free stop end within the bore in the corresponding molding. A disadvantage of this injection molding form consists in the fact that the local thickening formed by filling the freed opening in the core must then be removed again. This necessitates a subsequent mechanical processing step.

Furthermore, DE-GM 86 22 028 discloses an apparatus for holding cores in a casting mold. This apparatus provided that spacers be disposed which fix the core in the casting mold. These spacers are rings which surround the core or ring segments which partially surround it, which are in contact with the inner wall of the casting mold cavity and are composed of a thermoplastic synthetic resin whose melting range is the same as that of the encompassing material. A disadvantage of the arrangement of rings is that they must first be pushed onto the core, and especially in the case of irregularly shaped cores this is not possible without additional work. Moreover, these rings remain in the plastic molding which is subsequently formed and constitute a weak point since the bond between the ring and the injection molded material is not assured.

Also disclosed in DE-OS 39 20 100 is a process and an apparatus for the injection molding of a box-like container in whose wall cavities are provided running perpendicular to its standing surface. To form the cavities, elongated spars are provided in the apparatus which are supported by longitudinally movable pins to stabilize their position. To prevent holes from remaining in the completed container the pins are drawn away from the spars in accordance with the level of the injection pressure prevailing in their vicinity which changes as the level of the plastic present in their area increases, until their ends are flush with the surface of the part of the apparatus out of which they protrude. A disadvantage of this process is that, after the pins are withdrawn, the position of the core can change. The pins thus do not assure a uniform plastic structure.

SUMMARY OF THE INVENTION

The invention is therefore addressed to the problem of avoiding the aforementioned disadvantages and providing an apparatus as well as a process for the production of closed or open hollow bodies of synthetic resin, wherein post-treatment of the injection molding is unnecessary, and furthermore the core remains in its correct position until the end of the injection molding process.

Setting out from the preambles of the parallel independent claims, this problem is solved by their characterizing features. The substantial advantage of the invention is that an injection molding form is created which is provided at the critical points with movable stops for supporting the core of the mold, while at the same time a second injection passage is provided in these critical areas.

According to the process, first the cavities situated between the respective supporting elements are filled through a first injection passage. Since the core is supported any shifting of the core is not possible. Not until these cavities are nearly filled up and form a certain stabilization of the core, the stops are retracted and the rest of the cavity is filled through the second injection passage. Thus no local thickening occurs, and also the finished synthetic resin part contains no weak points in the form of inserts.

In one embodiment of the invention, both several first injection passages and several second injection passages are provided. The first injection passages are advantageously arranged in the area of outside radii of the cavity structure, and the second injection passages are situated at the movable stops.

These and other features of preferred embodiments of the invention will be found not only in the claims but also in the description and drawings.

The invention will be explained hereinafter with reference to a working embodiment.

DETAILED DESCRIPTION OF PREFERRED EMBODIMENTS

Figure 1:
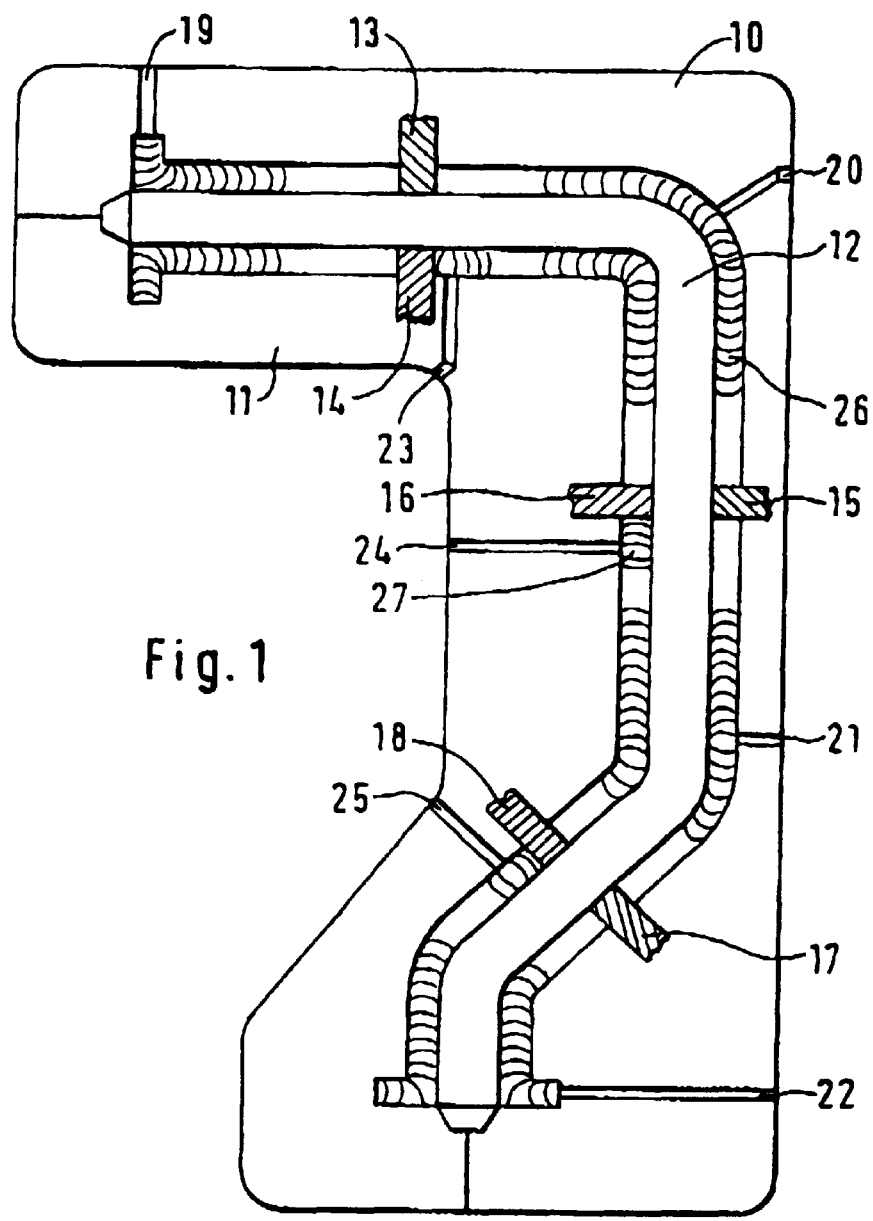
FIG. 1 shows a sectional view of an injection molding form with a supported mold core.

The injection molding form of FIG. 1 serves for producing irregularly shaped tubes, such as those used, for example, for air intakes of internal combustion engines. It consists of a first mold half 10 and of a second mold half 11. A basic profile molding core 12 is supported in the mold halves. In the halves are core holding slides (stops) 13, 14, 15, 16, 17, 18. These support the core 12. Furthermore, injection passages 19, 20, 21 and 22 are also provided in the mold halves; also, injection passages 3, 24 and 25 are situated in the area of the core-holding slides.

After the core 12 has been placed in the form, the form closed and the core-holding slides positioned in the position shown, synthetic resin material is injected in a first filling phase into the cavities 26 through the injection passages 19, 20, 21 and 22. This synthetic resin spreads out up to the vicinity of the core-holding slides. After this first filling phase the core-holding slides are retracted and the injection passages 23, 24 and 25 are activated, that is, synthetic resin material is injected through these injection passages into the cavities 27 which remain. Since the synthetic resin material injected during the first filling phase is not yet crosslinked, an intimate bond is formed between the injected materials.

The core-holding slides are flush with the inside wall of the mold halves 10 and 11, so that no accumulations of material or weakening of material occur at these points. After the plastic cools, the synthetic resin part is removed with the core 12. The core 12, which usually is composed of a low-melting metal alloy, is melted out in a known manner.

Figure 2:
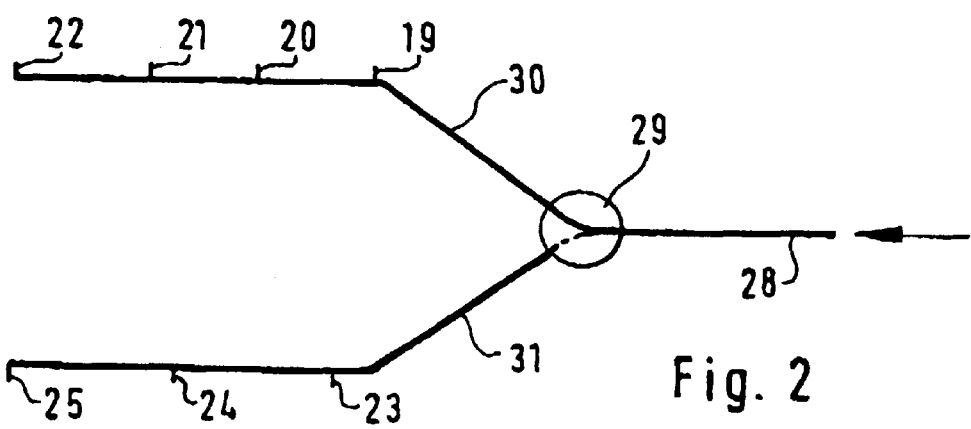
FIG. 2 shows a schematic representation of the course of a process.

The schematic diagram shown in FIG. 2 has an overall injection passage 28. This leads to a rotary valve 29 which connects this passage 28 to the main passage 30 and, after the rotary valve is turned, connects it with the main passage 31 as indicated by the broken line.

During the first filling phase the injection of the plastic takes place through the main passage 30 and the injection points 19, 20, 21 and 22. In a second phase the rotary valve is turned to the main passage 31, and then the filling of the remaining cavities is carried out through injection points 23, 24 and 25. The use of a rotary valve permits the molding to be made with a conventional injection molding machine. Therefore no special additional apparatus are needed.

What is claimed is:

1. An injection molding form for producing a hollow body of synthetic resin material, said form comprising first and second mold parts defining a mold cavity between them, a core disposed in said mold cavity, at least one retractable stop supporting said core in said mold cavity, said stop being retractable out of said mold cavity, and at least one first injection passage for injecting the synthetic resin material into said mold cavity and at least one second injection passage for injecting synthetic resin material into said mold cavity after said stop is retracted out of said mold cavity.

2. An injection molding form according to claim 1, wherein at least one second injection passage is situated adjacent each retractable stop.

3. An injection molding form according to claim 1, wherein said hollow body of synthetic resin material is an air intake tube for an internal combustion engine.

4. An injection molding form according to claim 1, wherein said form comprises a plurality of retractable stops, and at least one second injection passage is situated adjacent each retractable stop.

5. A process for molding a hollow body of synthetic resin material, said process comprising the steps of:

supporting a core in a mold cavity of an injection molding machine by at least one retractable stop;

partially filling the mold cavity with synthetic resin material by injecting the synthetic resin material into said mold cavity through at least one first injection passage until said core is supported by the injected material;

retracting said at least one retractable stop from the mold cavity so that said core is supported solely by the injected material; and thereafter completely filling said mold cavity with the synthetic resin material by injecting the synthetic resin material into said mold cavity through at least one second injection passage.

6. A process according to claim 5, wherein said core is supported by a plurality of retractable stops, and said mold cavity is completely filled through a plurality of second injection passages, and wherein each of the second injection passages is provided adjacent a respective one of the retractable stops.

7. A process according to claim 5, wherein said mold is partially filled through a plurality of first injection passages, at least one of the first injection passages being provided at each end of the mold and at an outer circumferential part of the hollow body to be produced.

\* \* \* \* \*